(12) United States Patent
Johnson (10) Patent No.: US 6,469,263 B1
(45) Date of Patent: Oct. 22, 2002

(54) HOSPITAL BED WEIGHING SYSTEM (75) Inventor: Michael Karl Johnson, Ellis, KS (US)

(73) Assignee: Raye's, Inc., Ellis, KS (US)

( * ) Notice: Subject to any disclaimer, the term of this patent is extended or adjusted under 35 U.S.C. 154(b) by 39 days.

(21) Appl. No.: 09/665,197

(22) Filed: Sep. 18, 2000

Related U.S. Application Data (60) Provisional application No. 60/154,712, filed on Sep. 18, 1999.

(51) Int. Cl.[7] .............................................. G01G 19/52
(52) U.S. Cl. ................................ 177/144; 5/611; 5/616
(58) Field of Search ............................. 177/144; 5/616, 5/611

(56) References Cited

U.S. PATENT DOCUMENTS 4,934,468 A * 6/1990 Koerber, Sr. et al. ....... 177/144
4,953,244 A * 9/1990 Koerber, Sr. et al. ....... 177/144

* cited by examiner

Primary Examiner—Randy W. Gibson
(74) Attorney, Agent, or Firm—Robert Blinn (57) ABSTRACT

The system of present invention is intended for use with a bed having a drive system for moving at least one movable section of the bed and a weight meter which receives transducer signals from transducers in the legs of the bed and displays a patient weight. In the system of the present invention the weight meter is operably coupled to the drive system so that when the drive system is activated, the weight meter automatically enters a hold mode wherein the weight meter stores the most recent weight value as a hold weight value. When the bed drive system is deactivated, the weight meter automatically returns to the operating mode by converting changes in the signals from the transducers into a change in weight value that is added to or subtracted from the hold weight value.

20 Claims, 4 Drawing Sheets

FIG. 4A

HOSPITAL BED WEIGHING SYSTEM

CROSS REFERENCE TO RELATED APPLICATIONS

This application claims the benefit of U.S. Provisional Patent Application No. 60/154,712 filed Sep. 18, 1999.

FIELD OF THE INVENTION

The present invention relates to a weighing system for a motorized hospital bed that has a drive system including motors and motor controls that are used to adjust the position of the bed. More particularly, the present invention relates to the coupling of the bed's drive system and the bed's weighing system so that the weighing system stores a last calculated hold weight value before any one of the bed's motors can begin operating and then continues calculating changes in measured weight in relation to the hold value after the bed's motors have stopped operating.

BACKGROUND OF THE INVENTION

Hospital beds that use weighing systems are known in the prior art. Generally, such weighing systems include transducers that produce signals in response to the magnitude of the loads transferred through the members supporting a bed. One common approach known within the art is to use load cells or force measurement type transducers. These load cells can, for example, be formed from a unitary block of metal machined into a parallelogram configuration to provide a pair of parallel flexible members known as flexures. Strain gauges secured to the flexures produce electrical signals responsive to the magnitude of the load applied to the flexures. The strain gages of a load cell are normally connected into a wheatstone bridge type circuit that can produce a voltage change in response to a change in the resistance of the strain gages. These voltage changes can be calibrated to known loads so that load cell signals can be displayed as weight values on a standard readout device known as a weight meter.

In some therapeutic situations, it is critical that the patient's weight be continuously tracked with a high level of precision. Beds that employ force transducer type weighing systems have a common disadvantage of measuring false changes in weight values when the bed position is changed, that is, when one section of the bed is moved relative to another section of the bed. Typically, patient weight will not change abruptly, however, the relatively abrupt movements that occur when the position of a bed is changed will cause sudden changes in the loads measured by the bed's transducers. This causes false indications that the weight of a patient has changed. Such erroneous indications of a weight change can interfere with patient care.

Many present bed weight measurement systems provide a "hold" function that causes a "hold" weight value to be stored while the bed is repositioned. After a bed having a hold function is repositioned, the hold function is manually released and the weight measurement system uses the hold weight value as a new baseline by resetting the value resulting from the next set of load cell signals after release of the hold function as equal to the hold weight value. From that point, the weight measurement system calculates changes in the patient's weight as a change in relation to the hold weight value and then as a change in the next weight value to continue producing weight values in an ongoing sequence. A manually operated hold function, however, must be activated every time a bed is repositioned. Present beds that have weighing systems and motorized systems for changing bed position do not have a means for automatically holding a weight value while a bed is repositioned. Since hospital personnel are often busy and distracted and since patients are often able to reposition their own beds, beds are often repositioned without activating a hold function. Consequently, false indications of changes in weight often occur when there is a change in bed position. What is needed is a bed having a position control system and a weight measurement system that are coupled so that the weight measurement system automatically enters into a hold mode while the position control system is changing the bed's position.

SUMMARY OF THE INVENTION

The system of the present invention satisfies this need because it has a position control system that is coupled with the weight measurement system via a logic control unit. The bed has a logic control unit that monitors and regulates the interaction between the weight measurement system and the position control system. The position control system includes motor units that are controlled by a position control unit. The weight measurement system includes load cells and a weight meter. The load cells are situated in the load paths of the members that support the bed and include strain gauges arranged in a wheatstone bridge circuit for producing signals for the weight meter. The weight meter converts strain gauge signals from the load cells to a weight value corresponding to the load supported by the bed.

In the system of the present invention, the weight measurement system is coupled to the position control unit via a logic control unit that monitors the position control unit and activates the weight meter to store a weight measurement. When a signal is given to the logic control unit to reposition the bed, the logic control unit will first activate the weight meter to initiate a hold function wherein the weight meter stores the most current weight measurement. Once the initiation of the weight meter hold function has been verified by a feedback signal to the logic control unit, the logic control unit will activate the position control unit to reposition the bed as desired. When the position control unit has completed repositioning the bed, a second feedback signal confirms to the logic control unit the deactivation of the position control unit. The logic control unit, upon receiving this second feedback signal, sends a signal to the weight meter to deactivate the hold function and restore the meter to display the last stored weight measurement. The weight measurement system then interprets subsequent sets of load cell signals as only producing changes in relation to the last stored weight value.

BRIEF DESCRIPTION OF THE DRAWINGS

The invention and its many attendant objects and advantages will become better understood upon reading the following detailed description of the preferred embodiment in conjunction with the following drawings, wherein.

DETAILED DESCRIPTION OF THE PREFERRED EMBODIMENT

Figure 1:
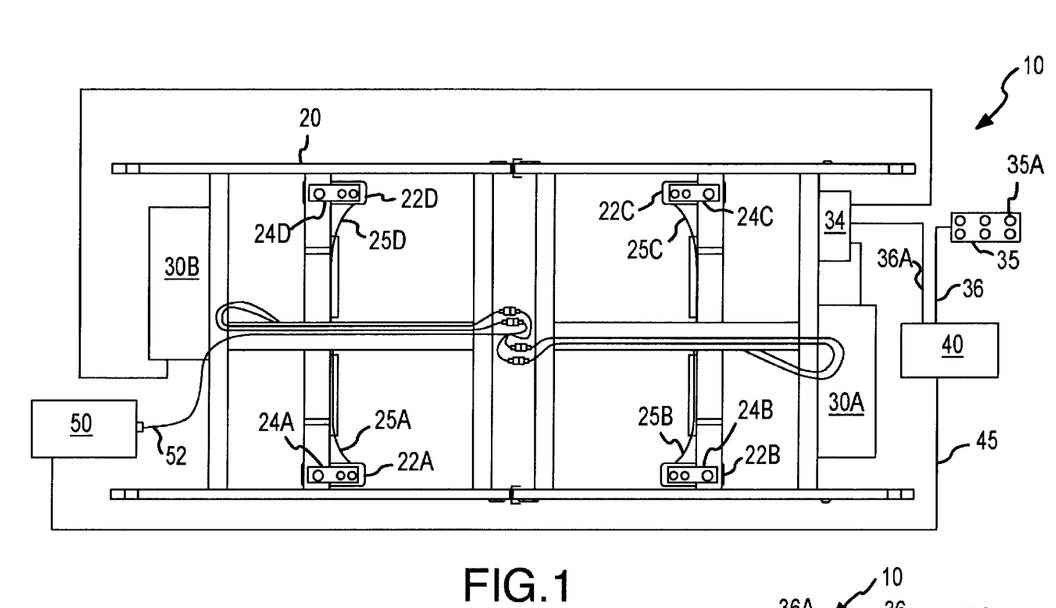
FIG. 1 is a plan view of a motorized hospital bed having the weighing system of the present invention.
Figure 2:
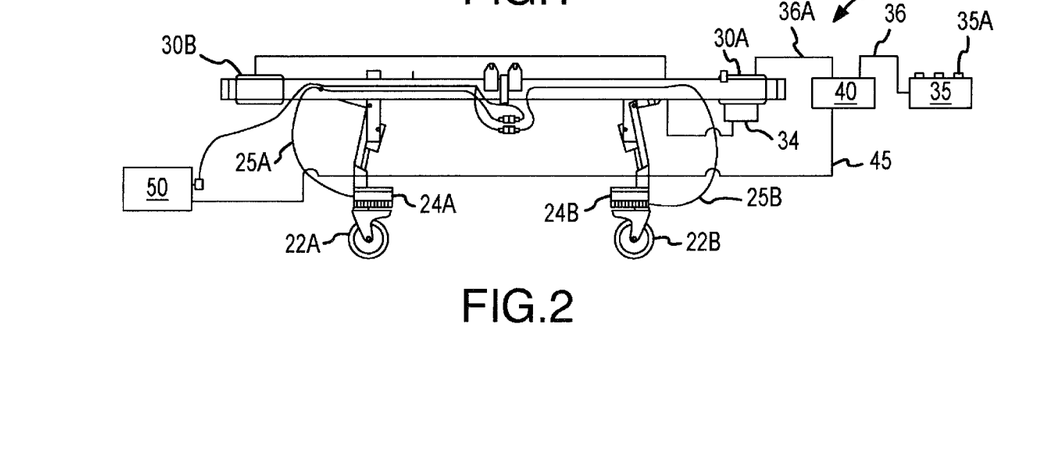
FIG. 2 is a side view of a motorized hospital bed having the weighing system of the present invention.

FIG. 1 and FIG. 2 show a motorized hospital bed 10 that includes a frame 20, caster wheel assemblies 22A, 22B, 22C and 22D, load cells 24A, 24B, 24C and 24D, motor units 30A and 30B, a position control unit 34, a logic control unit 40 and a weight meter 50.

As shown in FIG. 1 and FIG. 2, frame 20 of motorized bed 10 is supported by load cells 24A, 24B, 24C and 24D which are in turn supported by caster wheel assemblies 22A, 22B, 22C and 22D. Each of the load cells 24A, 24B, 24C and 24D are force measurement type transducers that produce signals which are carried by data transmission lines 25A, 25B, 25C and 25D and a single cable bundle 52 to weight meter 50. Weight meter 50 integrates the inputs from each of the load cells 24A, 24B, 24C and 24D and displays the weight supported by bed 10. The weight of bed 10 displayed by weight meter 50 can be normalized at zero when bed 10 is empty and in a pre-selected standard position so that weight meter 50 can display only the weight of the patient supported by bed 10.

Figure 3:
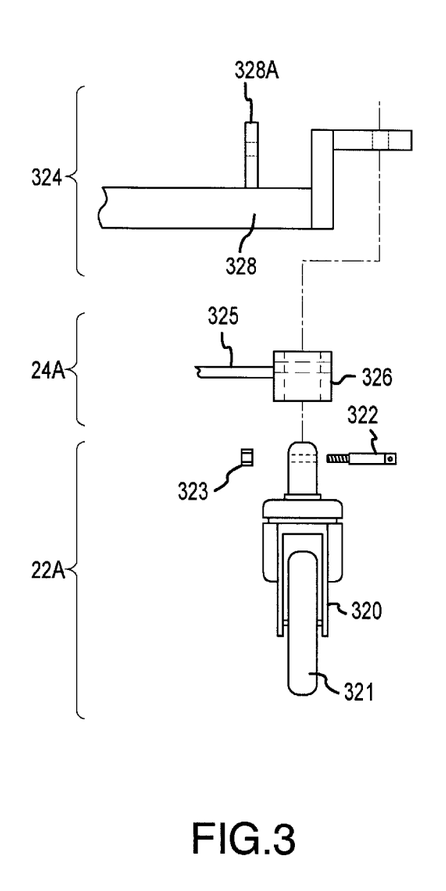
FIG. 3 is an exploded front view of a caster wheel assembly shown in FIG. 2.
Figure 3A:
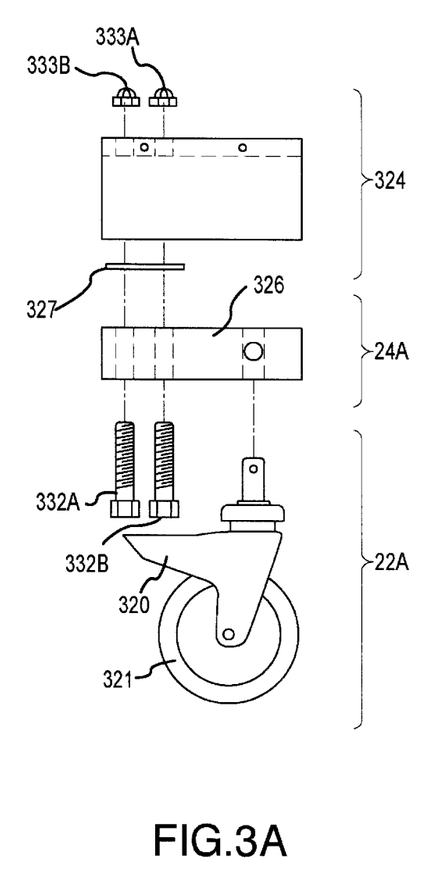
FIG. 3A is an exploded side view of a caster wheel assembly shown in FIG. 2.

FIG. 3 and FIG. 3A provide detailed, exploded views of caster wheel assembly 22A, load cell mount 324, and load cell 24A. Caster wheel assemblies 22A, 22B, 22C and 22D together with load cells 24A, 24B, 24C and 24D provide support members that support bed 10. Caster wheel assembly 22A includes a securing pin 322, a lock nut 323, a caster 320 and a wheel 321. Load cells 24A, 24B, 24C and 24D are transducers that are placed in the load paths of the support members supporting bed 10 which can produce signals in response to the amount of load transmitted through the load paths of the support members. In this preferred embodiment, load cell 24A like the other three load cells includes a strain gage force measurement transducer 326 and a signal cable 325. Load cell mount 324 provides a mounting for load cell 24A. Load cell mount 324 includes a caster wheel axle 328, a bed mounting bracket 328A, a spacer 327, bolts 332A and 332B, and securing nuts 333A and 333B. One end of the load cell 326 is secured to the load cell mount 324 by a pair of bolts 332A and 332B. Spacer 327 is placed between the load cell 326 and load cell mount 324 to allow the opposite end of the load cell 326 to deflect in response to changing loads. The caster wheel assembly 22A is secured to load cell 326 by pin 322 at the end of load cell 326 opposite the end where load cell 326 is secured to the load cell mount 324.

Caster wheel assembly 22A, load cell mount 324, and load cell 24A, when assembled complete a support member for supporting bed 10. Because of the presence of load cell 24A which produces signals that vary in response to the magnitude of the load carried by that support member, loads transmitted through this completed support member can be measured- As a load is transmitted from wheel axle 328, through load cell mount 324. through load cell 326 and finally to caster wheel assembly 22A, load cell 24A deflects and produces a variable electrical signal proportional to the applied load By using load cells such as load cell 24A signals can be provided to a weigh meter such as weight meter 50 shown in FIG. 1 and FIG. 2 Weight meter 50 can respond to those signals by continuously providing a weight value that corresponds to the total load being supported by the bed.

As shown in FIG. 1 and FIG. 2, motor units 30A and 30B are mounted to frame 20. Position control unit 34 controls motor units 30A and 30B. Position control unit 34 has a control input device which in this preferred embodiment is a hand held switch unit 35. Switch unit 35 is used to initiate various functions within position control unit 34 that cause The motors within motor units 30A and 30B to actuate mechanisms that change the positions of sections of bed 1 0 relative to other sections of bed 10. Typically, each of the switches 35A of switch unit 35 closes a low voltage direct current circuit that causes a high voltage alternating current relay to close within position control unit 35 to provide motive power to one of the motors in motor unit 30A or motor unit 30B. The motors in unit 30A and 30B are preferably reversible AC motors that can be activated at either a forward or reverse contact to run in a forward or a reverse direction.

Logic control unit 40 is used to monitor and to initiate various functions within position control unit 34 and weight meter 50. Logic control unit 40 controls and manages the sequencing of operations as motors are engaged and as the weight meter 50 moves between the hold mode and the operating mode. Logic control unit 40 can be programmable or it can be a set of analog circuits that accomplish the functions described below. When a switch 35A in switch unit 35 is depressed, logic control unit 40 receives a signal via cable 36 from switch unit 35 to activate a motor within motor units 30A and 30B and change the positioning of bed 10. Logic control unit 40 responds to this signal by sending to weight meter 50 via cable 45 a hold signal that causes weight meter 50 to enter into a "hold" function. When entering the hold function, weight meter 50 takes a weight reading and stores or holds that value. After entering the hold function, weight meter 50 sends a feedback signal to logic control unit 40 indicating that it has entered the hold function. In response to the feedback signal from weight meter 50, logic control unit 40 relays the motor activating signal from switch unit 35 to position control unit 34 via line 36A for the length of time switch 35A of switch unit 35 is depressed.

Once repositioning of bed 10 is completed as indicated by a releasing of switch 35A of switch unit 35, logic control unit 40 sends a signal to position control unit 34 to deactivate. After receiving a feedback signal from position control unit 34 indicating that it has deactivated and that all of the motors have ceased operating, logic control unit 40 then sends a resume signal to weight meter 50 causing it to leave the hold function and resume interpreting signals from load cells 24A, 24B, 24C and 24D in relation to the last stored hold weight value.

As those skilled in the art can readily appreciate, the above described functions of switch unit 35, logic control unit 40, position control unit 34 and weight meter 50 can be accomplished in a number of ways. In the preferred embodiment, switch unit 35 includes switches that independently close a number of low voltage circuits. Logic control unit 40 includes a relay arrangement that detects the closing of any one of those circuits and then produces a hold signal for weight meter 50 in the form of a low voltage current in a closed circuit. Upon receiving a feedback signal from weight meter 50, confirming that weight meter 50 is in the hold mode, logic control unit 40 closes a second relay that allows the low voltage current initiated at switch unit 35 to proceed on through the selected circuit or circuits to position control unit 34. Position control unit 34 responds to low voltage currents in a selected circuit or in a combination of selected circuits by closing the appropriate high voltage AC circuit or circuits to turn appropriate motors in either a forward or reverse direction as dictated by the signals originating in switch unit 35. Position control unit 34 also includes a relay arrangement that produces a low voltage current whenever any one of the motors is operating. This low voltage current indicating that one of the motors is running is also conveyed to logic control unit 40. Logic control unit 40 is programmed to respond to the presence of this feedback by continuing to send the hold signal to weight meter 50. When all of the motors stop, the low voltage current indicating that one of the motors is running will also stop. Logic control unit 40 is programmed to respond to this voltage drop by sending a resume operation signal to weight meter 50.

Figure 4:
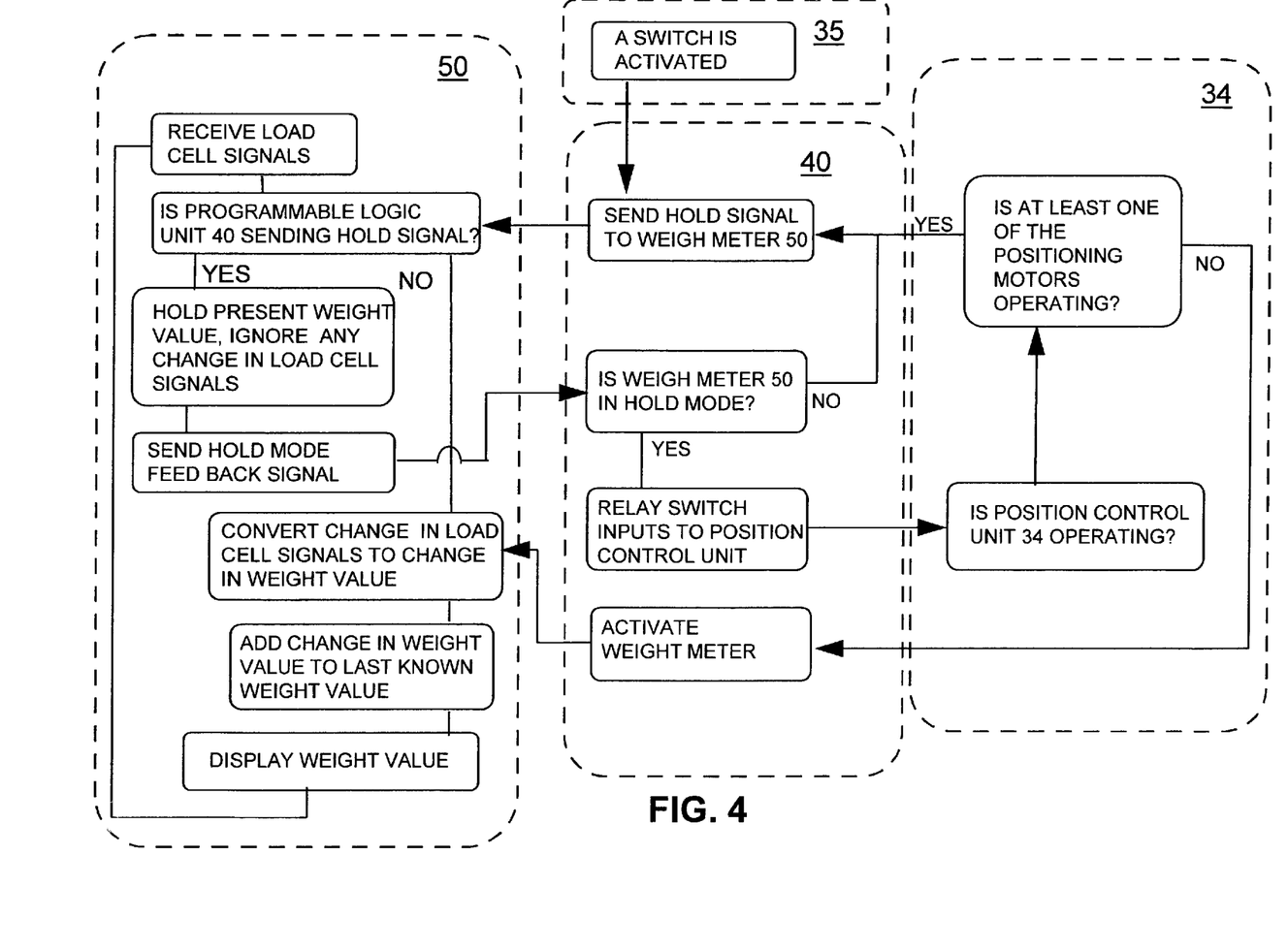
FIG. 4 is a block diagram of the logic steps employed by the logic control unit of the weighing system of the present invention.

FIG. 4 illustrates the logic controlling operation of the various elements of the invention system. In FIG. 4, signals passing between switch unit 35, logic control unit 40, weight meter 50 and position control unit 34 can be merely low voltage currents in a selected circuits as described above or signals that are coded to convey information such as a command to activate a motor or a commend to enter a mode of operation. FIG. 4 is intended to present the logic of the invention system rather than the actual mechanisms employed to accomplish system functions.

As shown in FIG. 4, when one or more switches 35A in hand held switch unit 35 are depressed, a signal goes to logic control unit 40. When logic control unit 40 receives the signal from switch unit 35 indicating that one or more switches 35A have been depressed, it sends a "hold" signal to weight meter 50. When weight meter 50 receives the "hold" signal from logic control unit 40, weight meter 50 enters the "hold" mode by calculating and storing the current weight value. This step could be accomplished by one of two methods. In a first method, when weight meter 50 receives a hold signal, weight meter 50 employ a constantly updated memory containing the last weight value which it could then instantly identify as the hold value. In a second method, weight meter 50, if it had no memory, could upon receiving a hold signal, sample signals from load cells 24A, 24B, 24C and 24D and calculate a hold value. Once weight meter 50 enters the hold mode and after it has stored the hold weight value, weight meter 50 ignores any changes in signals coming from load cells 24A, 24B, 24C and 24D.

As shown in FIG. 4, when one or ore switches 35A in hand held switch unit 35 are depressed, a signal goes to log c control unit 40. When logic control unit 40 receives the signal from switch unit 35 indicating that one or more switches 35A have been depressed, it sends a "hold" signal to weight meter 50. When weight meter 50 receives the "hold" signal from logic control unit 40, weight meter 50 enters the "hold" mode by determining and storing the current weight value. This step could be accomplished by one of two methods. In a first method, when weight meter 50 receives a hold signal, weight meter 50 employ a constantly updated memory containing the last weight value which it could then instantly identify as the hold value. In a second method, weight meter 50, if it had no memory, could upon receiving a hold signal, sample signals from load cells 24A, 24B, 24C and 24D and determine a hold value. Once weight meter 50 enters the hold mode and after it has stored the hold weight value, weight meter 50 ignores any changes in signals coming from load cells 24A, 24B, 24C and 24D.

The system of the present invention therefore has a weight meter 50 that ignores load cell inputs when bed 10 is moving. Because changes in signals from load cells 24A, 24B, 24C and 24D are ignored while bed 10 is in motion, apparent changes in patient weight that are actually caused by changes in the positions of sections of bed 10 relative to other sections of bed 10 are ignored.

Figure 4A:
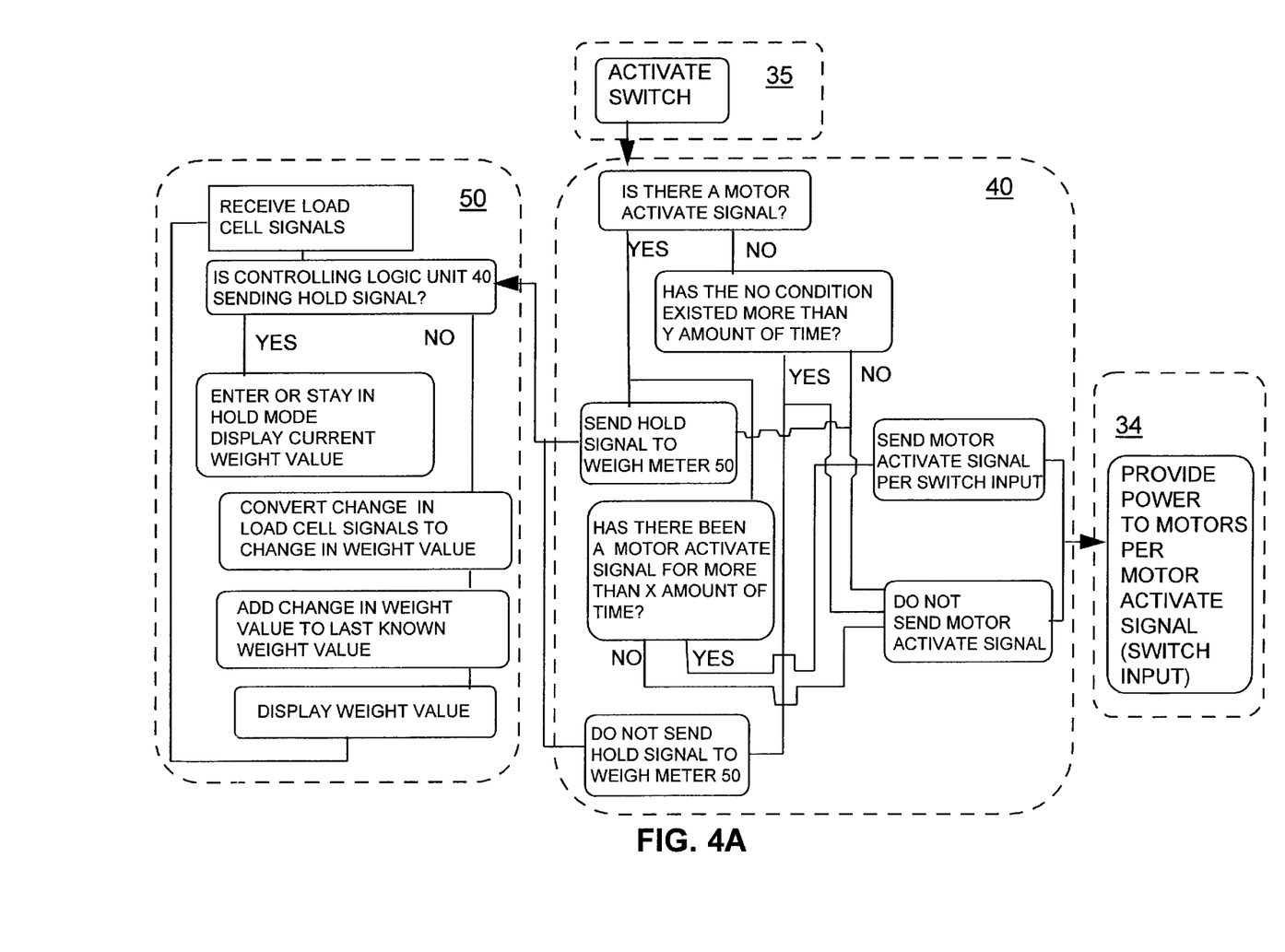
FIG. 4A is a block diagram of an alternate set of logic steps employed by the logic control unit of the weighing system in a second embodiment of the present invention.

FIG. 4A illustrates a second approach for initiating a hold function in weight meter 50 when a motor is activated. This second method uses timing instead of feedback signals between the various components to insure the proper sequencing of operations in the various components of the system. In FIG. 4A, when a switch in switch unit 35 is closed, the signal to activate position control unit 34 is routed to position control unit 34 and weight meter 50. However, the signal routed to position control unit 34 is delayed "x" amount of time to allow weight meter 50 to store and hold a weight value before position control unit 34 activates the bed motors. This sequence including a delay of "x" amount of time insures that the hold function is completely initiated in weight meter 50 before a motor is activated. If weight meter 50 includes a constantly updated memory capable of instantly providing a hold weight value for the hold mode, the amount of time "x" could be very short. When the previously closed switch in switch unit 35 is opened, the signal to position control unit 34 and weight meter 50 ceases. However, the signal drop off is allowed to lag "y" amount of time to weight meter 50 to allow position control unit 34 to completely deactivate motor operations before weight meter 50 resumes normal operation. This delay insures that the hold function in weight meter 50 continues for "y" amount of time after all of the switches in switch unit 34 are open and all of the motors have completely stopped. This gives the time for the movement in the bed to stop before weight meter 50 resumes normal operation.

As can be seen from the forgoing descriptions, any one of a number of methods can be used to initiate a hold state within weight meter 50. A logic control unit similar to logic control unit 40 could be placed exclusively in communication with position control unit 34 and weight meter 50 so that any operation of position control unit 34 would initiate a hold function in weight meter 50. A logic control unit similar to logic control unit 40 could be placed exclusively in communication with hand held switch unit 35 and weight meter 50 so that any operation of switch unit 35 would initiate a hold function in weight meter 50.

Although many ways can be selected to accomplish the functions of the present invention system. the present invention system is a system for suspending the operation of the weight meter of an adjustable hospital bed when the position of the hospital bed is being adjusted where the weight meter would normally receive inputs from load transducers placed in the load paths of the bed support members and constantly or periodically update the weight value based on changes in those inputs. What is necessary to the present invention is that a system of the present invention have a way detect the activation of any motor used to adjust the position of a bed and that upon the detection of such activation, a hold signal is sent to the weight meter which responds by holding the last calculated hold weight value while any of the motors are operating and until after they have all ceased operating. When the motors cease operating, a system of the present invention must have the second capability of either ceasing to send a hold signal or sending a second signal to the weight meter so that the weight meter can respond by continuing to calculate changes in weight in relation to the hold weight value based on changes in signals coming from the load transducers.

The invention has been described above in considerable detail in order to comply with the patent laws by providing a full public disclosure of at least one of its embodiments. However, such a detailed description is not intended in any way to limit the broad features or principles of the invention, or the scope of patent monopoly to be granted. The skilled reader in view of this specification may envision numerous other modifications and variations of the above disclosed embodiments. Accordingly, the reader should understand that these modifications and variations and the equivalence thereof, are within the spirit and scope of this invention as defined by the following claims wherein I claim:

1. A system for monitoring the weight of a patient lying on a hospital bed, comprising:

(a) a hospital bed having a frame including support members for supporting the hospital bed in relation to a floor and at least one movable section that can move in relation to the frame, (b) a drive system including at least one motor for driving a mechanism for moving the at least one movable section of the bed and a control input device for activating the at least one motor, (c) transducers incorporated into each of the support members of the frame that produce signals that change in response to changes in the loads carried by each of the support members, (d) a weight meter in communication with the transducers at each support member that receives signals from the transducers, the weight meter having an operating mode wherein the weight meter receives and processes signals from the transducers to determine a weight value corresponding to the weight supported by the bed and wherein the weight meter changes the weight value in response to changes in the signals from the transducers to produce a sequence of weight values in response to the changes in signals from the transducers, the weight meter also operably coupled to the drive system so that when a motor of the drive system is activated, the weight meter enters a hold mode wherein the weight meter determines and stores the most recent weight value as a hold weight value and continues to store the hold weight value while a motor of the drive system is operating, the weight meter also operably coupled to the drive system so that when all of the operating motors of the drive system cease operating, the weight meter returns to the operating mode by starting with the hold weight value and converting changes in the signals from the transducers into a change in weight value that is added to or subtracted from the hold weight value to determine the next weight value in the sequence of weight values.

2. The system of claim one wherein:

the weight meter is connected to the drive system via a logic control unit, the logic control unit connected to the drive system so that when a motor of the drive system is operating, the logic control unit transmits a hold signal to the weight meter, the weight meter responding to the hold signal by entering the hold function, the logic control unit also connected to the drive system so that when all of the operating motors of the drive system cease operating, the logic control unit stops sending a hold signal to the weight meter, the weight meter responding to the termination of the hold signal by returning to the operating mode.

3. The system of claim one wherein:

the weight meter is connected to the drive system via a logic control unit, the logic control unit connected to the drive system so that when a motor of the drive system is operating, the logic control unit transmits a hold signal to the weight meter, the weight meter responding to the hold signal by entering the hold function, the logic control unit also connected to the drive system so that when all of the operating motors of the drive system cease operating, the logic control unit sends a resume signal to the weight meter, the weight meter responding to the resume signal by returning to the operating mode.

4. The system of claim one wherein:

the weight meter is connected to the drive system via a logic control unit, the logic control unit connected to the drive system so that when a motor of the drive system is operating, the logic control unit transmits a hold signal to the weight meter, the weight meter responding to the hold signal by entering the hold function, the logic control unit also connected to the drive system so that when all of the operating motors of the drive system cease operating, the logic control unit sends a resume signal to the weight meter, the weight meter responding to the resume signal by returning to the operating mode.

5. The system of claim one wherein:

the weight meter is connected to the drive system via a logic control unit and the control input device is also connected to the at least one motor of the drive system through the logic control unit, the logic control unit transmitting a hold signal to the weight meter when the control input device is activated, the weight meter responding to the hold signal by entering the hold function, the control input device delaying a predetermined period of time before relaying the input from the control input device to the at least one electric motor of the drive system, the logic control unit also connected to the drive system so that when all of the operating motors of the drive system cease operating, the logic control unit delays a predetermined period of time and then stops sending a hold signal to the weight meter, the weight meter responding to the termination of the hold signal by returning to the operating mode.

6. A system for monitoring the weight of a patient lying on a hospital bed, comprising:

(a) a hospital bed having a frame including support members for supporting the hospital bed in relation to a floor and movable sections that can move in relation to the frame, (b) a drive system including motors for driving mechanisms for moving the movable sections of the bed in relation to the frame of the bed and a control input device for selectively activating the motors, (c) transducers incorporated into each of the support members of the frame that produce signals that change in response to changes in the loads carried by each of the support members, (d) a weight meter in communication with the transducers at each support member that receives signals from the transducers, the weight meter having an operating mode wherein the weight meter receives and processes signals from the transducers to find a weight value corresponding to the weight supported by the bed and wherein the weight meter changes the weight value in response to changes in the signals from the transducers to produce a sequence of weight values in response to the changes in signals from the transducers, the weight meter also operably coupled to the drive system so that when any one of the motors of the drive system is activated, the weight meter enters a hold mode wherein the weight meter determines and stores the most recent weight value as a hold weight value and continues to store the hold weight value while at least one motor of the drive system is operating, the weight meter also operably coupled to the drive system so that when all of the operating motors of the drive system have ceased operating, the weight meter returns to the operating mode by starting with the hold weight value and converting changes in the signals from the transducers into a change in weight value that is added to or subtracted from the hold weight value to determine the next weight value in the sequence of weight values.

7. The system of claim six wherein:
the weight meter is connected to the drive system via a logic control unit, the logic control unit connected to the drive system so that when at least one of the motors of the drive system is operating, the logic control unit transmits a hold signal to the weight meter, the weight meter responding to the hold signal by entering the hold function, the logic control unit also connected to the drive system so that when all of the operating motors of the drive system have ceased operating, the logic control unit stops sending a hold signal to the weight meter, the weight meter responding to the termination of the hold signal by returning to the operating mode.

8. The system of claim six wherein:
the weight meter is connected to the drive system via a logic control unit, the logic control unit connected to the drive system so that when at least one of the motors of the drive system is operating, the logic control unit transmits a hold signal to the weight meter, the weight meter responding to the hold signal by entering the hold function, the logic control unit also connected to the drive system so that when all of the operating motors of the drive system have ceased operating, the logic control unit sends a resume signal to the weight meter, the weight meter responding to the resume signal by returning to the operating mode.

9. The system of claim six wherein:
the weight meter is connected to the drive system via a logic control unit and the control input device is also connected to the motors through the logic control unit, so that when the control input device is activated, the logic control unit transmits a hold signal to the weight meter, the weight meter responding to the hold signal by entering the hold function, the logic control unit also connected to the drive system so that when all of the operating motors of the drive system have ceased operating, the logic control unit stops sending a hold signal to the weight meter, the weight meter responding to the termination of the hold signal by returning to the operating mode.

10. The system of claim six wherein:
the weight meter is connected to the drive system via a logic control unit and the control input device is also connected to the motors of through the logic control unit, the logic control unit transmitting a hold signal to the weight meter when the control input device is activated, the weight meter responding to the hold signal by entering the hold function, the control input device delaying a predetermined period of time before relaying the input from the control input device on to the at least one motor, the logic control unit also connected to the drive system so that when all of the operating motors of the drive system have ceased operating, the logic control unit delays a predetermined period of time and stops sending the hold signal to the weight meter, the weight meter responding to the termination of the hold signal by returning to the operating mode.

11. The system of claim six wherein:
the weight meter is connected to the drive system via a logic control unit and the control input device is also connected to the motors through the logic control unit, the logic control unit transmitting a hold signal to the weight meter when the control input device is activated, the weight meter responding to the hold signal by entering the hold function, the control input device delaying a predetermined period of time before relaying the input from the control input device to the motor, the logic control unit also connected to the drive system so that when all of the operating motors of the drive system have ceased operating, the logic control unit delays a predetermined period of time and sends a resume signal to the weight meter, the weight meter responding to the resume signal by returning to the operating mode.

12. A system for monitoring the weight of a patient lying on a hospital bed, comprising;
(a) a hospital bed having a frame including support members for supporting the hospital bed in relation to a floor and movable sections that can move in relation to the frame,
(b) a drive system including electric motors mounted to the frame for driving mechanisms for moving the movable sections of the bed in relation to the bed, a switch unit having switches that can be placed in switch positions for selecting motor functions, the switch unit producing motor control signals, the drive system also including a position control unit for receiving motor control signals from the switch unit and selectively providing power to the motors as indicated by switch positions,
(c) transducers incorporated into each of the support members of the frame that produce signals that change in response to changes in the loads carried by each of the support members,
(d) a logic control unit connected between the switch unit and the position control unit of the drive system, the logic control unit automatically generating a hold signal when a switch of the switch unit is placed in a switch position to activate an electric motor of the drive system,
(e) a weight meter in communication with the transducers at each support member that receives signals from the transducers, the weight meter having an operating mode wherein the weight meter receives and processes signals from the transducers to determine a weight value corresponding to the weight supported by the bed and wherein the weight meter changes the weight value in response to changes in the signals from the transducers to produce a sequence of weight values that change in response to the changes in signals from the transducers, the weight meter also communicating with the logic control unit so that it can receive the hold signal from the logic control unit that is automatically generated by the logic control unit when a switch of the switch unit is placed in a switch position to activate an electric motor of the drive system and respond to the hold signal by entering a hold mode by first storing and then holding the most recent weight value as a hold weight value and by then continuing to store the hold weight value while the hold signal continues, the weight meter also responding to the termination of the hold signal by returning to the operating mode by starting with the hold weight value and converting changes in the signals from the transducers into a change in weight value that is added to or subtracted from the hold weight value to determine the next weight value in the sequence of weight values.

13. The system of claim 12 wherein:

the logic control unit delays the relay of motor control signals from the switch unit to the position control unit for a predetermined amount of time.

14. The system of claim 12 wherein:

the weight meter stores its last weight value and also stores that value as the hold value upon receiving a hold signal in a substantially instantaneous manner.

15. The system of claim 12 wherein:

the weight meter produces a hold feedback signal when it has completely entered the hold mode and wherein the logic control unit delays the relay of motor control signals from the switch unit to the position control unit until receiving the hold feedback signal from the weight meter.

16. The system of claim 12 wherein:

the weight meter produces a hold feedback signal when it has completely entered the hold mode and wherein the logic control unit delays the relay of motor control signals from the switch unit to the position control unit until receiving the hold feedback signal from the weight meter, and, wherein the weight meter stores its last weight value and also stores that value as the hold value upon receiving a hold signal in a substantially instantaneous manner so that the weight meter may transmit a hold feedback signal to the logic control unit almost immediately after receiving a hold signal from the logic control unit.

17. The system of claim 12 wherein:

the weight meter produces a first feedback signal when the weight meter has completely entered the hold mode, wherein the logic control unit delays the relay of motor control signals from the switch unit to the position control unit until receiving the first feedback signal from the weight meter, wherein the position control unit also produces a second feedback signal that is transmitted to the weight meter when no motors are running and wherein the weight meter does not resume functioning in the operating mode until it is no longer receiving the first feedback signal and until it has also received the second feedback signal.

18. The system of claim 12 wherein:

the weight meter produces a first feedback signal when the weight meter has completely entered the hold mode, wherein the logic control unit delays the relay of motor control signals from the switch unit to the position control unit until it receives the first feedback signal from the weight meter, wherein the position control unit also produces a second feedback signal that is transmitted to the weight meter when a motor is running and wherein the weight meter does not leave the hold mode and resume functioning in the operating mode until it is not receiving the first feedback signal and it is not receiving the second feedback signal.

19. The system of claim 12 wherein:

the weight meter produces a first feedback signal when the weight meter has completely entered the hold mode, wherein the logic control unit delays the relay of motor control signals from the switch unit to the position control unit until receiving the first feedback signal from the weight meter, wherein the position control unit also produces a second feedback signal that is transmitted to weight meter via the logic control unit when no motors are running and wherein the weight meter does not resume functioning in the operating mode until it is no longer receiving the first feedback signal and until it has also received the second feedback signal.

20. The system of claim 12 wherein:

the weight meter produces a first feedback signal when the weight meter has completely entered the hold mode, wherein the logic control unit delays the relay of motor control signals from the switch unit to the position control unit until it receives the first feedback signal from the weight meter, wherein the position control unit also produces a second feedback signal that is transmitted to the weight meter via the logic control unit when a motor is running and wherein the weight meter does not leave the hold mode and resume functioning in the operating mode until it is not receiving the first feedback signal and it is not receiving the second feedback signal.

* * * * *